3,674,429
ADSORPTION PROCESS FOR WATER AND NITROGEN OXIDES

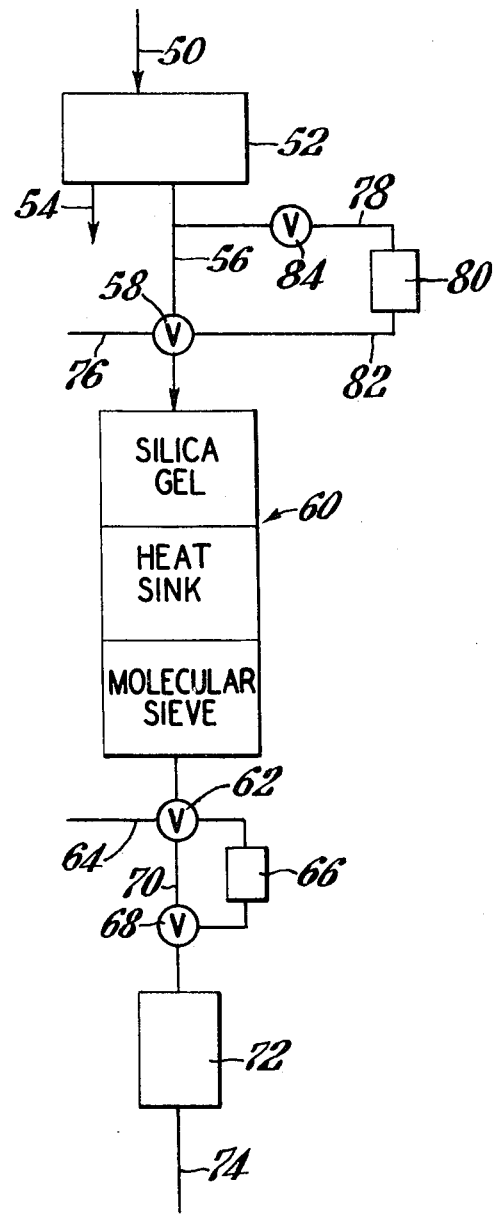

John Joseph Collins, Katonah, N.Y., assignor to Union Carbide Corporation, New York, N.Y.
Filed Jan. 6, 1971, Ser. No. 104,262
Int. Cl. C01b 21/70; B01d 53/16
U.S. Cl. 23—159    3 Claims

ABSTRACT OF THE DISCLOSURE

In the process wherein nitrogen oxides are recovered from stack gas streams containing water vapor by selective adsorption using a dual bed of silica gel and molecular sieves, the formation of corrosive aqueous nitric acid in the adsorbent bed during regeneration thereof is prevented by the use of a heat sink interposed between the silica gel and the molecular sieve. The heat sink serves to prevent premature desorption of water from the silica gel bed and the contact of liquid water with desorbed $NO_2$.

---

The present invention relates, in general, to the removal of nitrogen oxides from gas streams containing same in addition to water vapor, and more particularly, to an improved process for such removal using a dual adsorbent system comprising silica gel and a zeolitic molecular sieve, the two adsorbent masses being separated by an inert solid heat sink.

For the most part, nitric acid is currently produced on a commercial scale by the catalyzed oxidation of ammonia and the subsequent reaction of $NO_2$ or $N_2O_4$ with water. The initial reaction between oxygen and ammonia produces a mixture of water and nitrogen oxides principally as nitric oxide, i.e., NO. A secondary oxidation step further converts the nitric oxide to nitrogen dioxide, $NO_2$, and/or the dimer form of $NO_2$, namely dinitrogen tetraoxide, $N_2O_4$. The absorption of $NO_2$ and/or $N_2O_4$ in water spontaneously produces nitric acid in accordance with one or both of the equations:

(1) 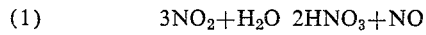
(2) 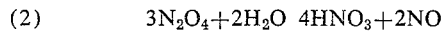

Further oxidation of the NO produced by these reactions is carried out in the aqueous absorption zone and the $NO_2$, thus formed is also reacted with water to produce additional, but successively ever diminishing, quantities of NO by the same mechanism. The waste or tail gas from the aqueous absorbed contains normally about 0.15 to 0.3 mole percent unabsorbed oxides of nitrogen (commonly expressed as $NO_x$), principally NO and $NO_2$.

By virtue of being emitted from an aqueous absorption zone, the tail gas from which the $NO_x$ values are to be recovered contains water vapor. There are present in the gas stream, therefore, all of the necessary reagents for forming nitric acid, and the surface of most solids appears to facilitate the contact of these reagents. A solid sorbent, to be useful in this application must, accordingly, be able to withstand the corrosiveness of aqueous nitric acid of any and all concentrations. There are, moreover, only relatively few adsorbents which are practical possibilities from the standpoint of availability and cost.

In copending application Ser. No. 38,142, filed May 18, 1970, by R. D. Taylor, there is disclosed a novel selective adsorption process for recovering the nitrogen oxides from nitric acid plant tail gas streams and the like, which utilizes a dual system of adsorbents, namely silica gel and zeolitic molecular sieves, in a series relationship. In essence, this process comprises contacting a gas mixture comprising water vapor, nitrogen, and at least one of the gases NO and $NO_2$, said gas stream also containing oxygen when $NO_2$ is absent therefrom, with an adsorbent bed of activated (dehydrated) silica gel sufficient to adsorb the water vapor therefrom, then contacting the gas mixture constituents unadsorbed by said silica gel with a zeolite, preferably of the cage type, having a pore size large enough to admit $NO_2$, i.e., at least about 4 angstroms whereby NO is catalytically oxidized to $NO_2$ and $NO_2$ is adsorbed in said zeolite, and thereafter desorbing the $NO_2$ from the zeolite adsorbent, and the water from the silica gel. During the adsorption stroke, the incoming gas stream is dried by contact with the silica gel bed which does not adsorb $NO_2$ appreciably at the temperatures involved, and the $NO_2$ is thereafter adsorbed on the molecular sieve bed in the absence of moisture. This procedure prevents the formation of nitric acid in the molecular sieve bed with resultant degradation of that adsorbent. Desorption of the adsorption system is accomplished by passing a hot dry inert stripping purge gas stream such as air countercurrently through the dual bed system. As the heat transfer and desorbing zone moves from the molecular sieve bed into the silica gel bed, there is a period wherein water is being desorbed from the silica gel by a stripping gas which contains nitrogen dioxide that it picked up in the trailing edge of the heat transfer zone that is still emerging from the molecular sieve bed. This portion of purge gas, containing both water vapor and nitrogen dioxide and having left its elevated heat in the heat transfer and desorption zone, can now form corrosive, aqueous nitric acid. Although the silica gel is resistant to nitric acid and is not thereby degraded, it has been deemed necessary to employ expensive acid-resistant construction materials for the adsorption chamber, fittings and conduits which contact this corrosive desorbate.

It is, accordingly, the general object of the present invention to provide an improvement in the aforesaid process which avoids, or greatly reduces, the formation of corrosive aqueous nitric acid during adsorption system regeneration, and, hence, the need for the more expensive and corrosion-resistant apparatus.

Accordingly, in the process for recovering nitrogen oxides which comprises the steps of providing a gas stream comprising water vapor, nitrogen and at least one of the gases NO and $NO_2$, said gas stream also containing oxygen when $NO_2$ is absent therefrom, contacting said gas stream with an adsorbent silica gel in relative proportions and for sufficient time to remove substantially all of the water vapor therefrom, and thereafter contacting the resulting dehydrated gas stream with an activated crystalline zeolitic molecular sieve adsorbent whereby at least some of any NO present is oxidized to $NO_2$ and $NO_2$ is adsorbed thereon, the aforesaid objective is accomplished by the improvement which comprises providing a solid heat sink and passing the effluent purge gas from the molecular sieve bed therethrough prior to passing said stream through the silica gel bed at least during the period when the temperature of the effluent gas from the molecular sieve bed is essentially as high as the purge gas entering the inlet end of the molecular sieve bed, the heat sink having sufficient heat capacity to prevent the heat front leaving the molecular sieve bed from entering the silica gel bed until after at least 50%, and preferably at least 80% of the $NO_2$ therefrom has passed through the silica gel bed.

The present invention is advantageously exemplified, illustrated and its elements amplified by the following description in conjunction with the drawing which is a schematic flow sheet using a single compound adsorbent bed.

The feed stream to be treated is considered for purposes of this illustration to be a waste gas stream from a nitric acid plant containing NO, $NO_2$, $N_2$, $O_2$ and saturated with respect to water vapor. It will be understood by those skilled in the art that whereas the gas mixtures of primary interest in the present invention are tail gases or stack gases from nitric acid plants, the process is equally suitable for removing NO and/or $NO_2$ from any gas stream which contains same in combination with water vapor and any other gases which are not destructive of the adsorbent materials, especially the zeolitic molecular sieves. Since NO is not strongly adsorbed by zeolites, stoichiometric quantities of oxygen must be present with respect to the quantity of NO which is to be removed. Illustrative of other gaseous substances which can be a part of the gas mixture being treated are argon, helium, neon and carbon dioxide. A representative tail gas stream from an ammonia oxidation type $HNO_3$ process contains in parts by volume,

| | |
|---|---|
| Oxygen | 3.0 |
| Water | 0.6 |
| Nitrogen oxides ($NO+NO_2$) | 0.3 |
| Nitrogen | 96.1 |

It is well known, however, that these tail gas streams are subject to variations in composition even during continuous operation of the process. These variations are due in large part to changes in the relative rate at which excess air for oxidation of the nitric oxide is supplied and the necessary alterations in the proportions of air and ammonia supplied to the catalytic reactor to prevent catalyst overheating. As a result, the oxygen volume percent can occasionally increase from about 0.2 to 20. Even variations of this magnitude are compatible with the recovery process of this invention.

The silica gel employed as the desiccant in the process can be any of the numerous commercially-available adsorbent grade materials such as are obtained by the suitable coagulation of hydrated silica obtained by destabilizing an aqueous silicate solution. The silica gel is, of course, activated or to a substantial degree dehydrated at the start-up of the $NO_x$ recovery process.

Because the gas stream contacting the zeolite adsorbent material is dry, there is essentially no nitric acid formation which would result from contact between water and adsorbed $NO_2$. Consequently, any zeolitic molecular sieve, both natural and synthetic, can be used to remove the NO and $NO_2$ from the gas stream, provided the zeolite has a pore size sufficient to admit $NO_2$. Illustrative of these molecular sieves are zeolite K-G disclosed in U.S. Pat. 3,056,654, zeolite W disclosed in U.S. Pat. 3,012,853, zeolite S disclosed in U.S. Pat. 3,054,657, zeolite T disclosed in U.S. Pat. 2,950,952, zeolite X disclosed in U.S. Pat. 2,882,244, zeolite A disclosed in U.S. Pat. 2,882,243, zeolite Y disclosed in U.S. Pat. 3,130,007, and zeolite L disclosed in U.S. Pat. 3,216,789. Suitable naturally-occurring zeolitic molecular sieves include chabasite, erionite, gmelinite, mordenite, and faujasite. The synthetic forms of mordenite are also suitable. It is to be understood that no known zeolitic molecular sieve per se adsorbs nitric oxide to a significant degree. Apparently, all known zeolitic molecular sieves do, however, have at least some ability to catalyze the oxidation of NO to $NO_2$ in the presence of oxygen. Further, zeolite adsorbed $NO_2$ appears to be able to combine with NO to form $N_2O_3$ which is retained as an adsorbate or further oxidized to $N_2O_4$. The precise mechanism of adsorption of the $NO_x$ values is not a critical matter to the present process.

On the adsorption stroke, the feed stream is introduced into the system through line 50 at a temperature of about 90° F. under a pressure of about 90 p.s.i. Because considerable water can be removed from the water saturated feed stream by lowering its temperature, line 50 conducts the feed stream to cooler-condenser 52, wherein the temperature is reduced to about 60° F., and the water condensed from the gas stream is removed through line 54. The partially dehydrated feed gas thus produced is passed through line 56 and valve 58 to dual adsorbent bed 60 containing in the first section thereof to be contacted by the incoming gas stream, silica gel. The second section of the adsorbent bed contains the inert solid heat sink material, and the third section contains the zeolitic molecular sieve. The adsorptive capacity of the silica gel for water increases with increasing pressure within the pressure range herein contemplated. In general, the temperature of the gas entering the desiccant bed on the adsorption stroke will be between about 60° F. and about 90° F., and at a pressure of about 110 p.s.i.g., but temperatures of from 40° F. to 150° F. and pressures of from about 1 atmosphere to 30 atmospheres are suitably employed. Substantially all of the remaining water is removed as the gas stream passes through the silica gel bed. The dehydrated gas then passes through the heat sink section. If, due to the heat sink portion of the bed happens to be cooler than the gas stream entering from the silica gel portion, the heat sink portion will exhibit a "recooperator" type behavior. Such behavior, i.e., the withholding of the heat front to some extent from the molecular sieve bed, is beneficial in that the capacity of the molecular sieve bed for adsorbing $NO_2$ increases, within limits, with decreasing temperatures. $NO_2$ initially present in the feed stream and NO oxidized to $NO_2$ is adsorbed in the molecular sieve portion of the bed. The effluent from bed 60, principally nitrogen and oxygen, is directed partially or wholly through valve 62 and out line 64 to power recovery, or through heater 66 and valve 68, or through line 70 and valve 68 (thereby by-passing the heater 66) through adsorbent bed 72. This latter adsorbent bed advantageously contains a molecular sieve having a large capacity for $H_2O$ such as zeolite 4A, i.e., the sodium form of zeolite A. The dry effluent gas from bed 60 serves to desorb any water vapor from bed 72. In regenerating bed 72, the heater 66 is advantageously employed.

The regeneration of the compound bed 60 is accomplished by countercurrent strip purging using a hot dry inert purge gas such as air or nitrogen. The purge gas stream, ordinarily at ambient temperature, is fed through line 74 to bed 72 to insure that the purge gas is substantially fully dehydrated and then passed through valve 68 to heater 66 where its temperature is, if necessary, raised to a temperature of between 250° F. and 750° F. The hot purge gas leaving heater 66 is directed through valve 62 to the molecular sieve portion of compound bed 60. The incoming hot purge gas establishes an advancing heat front in the bed in the molecular sieve section, and carries desorbed $NO_2$ toward the silica gel end of the bed. The heat front eventually leaves the molecular sieve section and is re-established in the heat sink section before the bulk of the $NO_2$ has been purged from the molecular sieve. The heat sink material, delaying the establishment of the hot purge heat front in the silica gel section, permits at least 50% of the $NO_2$ initially adsorbed in the molecular sieve section to have passed out of the silica gel section before the hot purge begins to desorb water therefrom.

It will be thus understood by those skilled in the art that the kind of material used in the heat sink and the size of the heat sink will vary depending on several variable factors. These factors include the size and configuration of the various bed sections, the particular molecular sieve employed and the size and composition of the agglomerated zeolite forms, the degree to which the adsorptive capacity of either the silica gel or the molecular sieve sections of the bed are loaded during the adsorption stroke, the temperature of the purge gas, and numerous others which are routinely fixed in accordance with good engineering practice in view of the particular feed stream being treated.

The materials which comprise the heat sink can be any material which will not to any significant degree alter the gas stream passing over it, either by reaction with the components or by adsorbing nitrogen oxide. Shaped forms such as pellets, bricks or beads or irregular forms such as are formed by crushing larger bodies of glass, quartz, metal, mineral rocks, beach pebbles and the like. Materials of high heat capacity and good thermal conductivity are to be preferred in order to limit the size of the heat sink section to reasonable proportions.

After the heat front has passed through the silica gel section and sufficient hot purge gas has been used to regenerate the silica gel, the effluent stream from the bed passing through valve 58 and line 76 for $NO_2$ utilization or disposal, a cool purge gas stream is employed to return the bed 60 to adsorption stroke temperature. Advantageously, this cool-down is accomplished by continuing the strip purge operation, but by passing heater 66 using valves 62 and 68 and line 70.

It is also advantageous to avoid contact of liquid water with the silica gel in the bed during the adsorption stroke. It is sometimes observed that when treating a gas stream saturated with water vapor, the cooling which occurs in condenser 52 results in the formation of minute droplets of liquid water which are not readily separated from the gas stream before it leaves the condenser. These droplets are, therefore, carried forward and are deposited on the silica gel where incoming $NO_2$ can contact same and form harmful nitric acid.

To avoid this problem when encountered, the effluent from condenser 52 can be fed through valve 84, line 78, heater 80 and line 82 before entering bed 60. The heater is used to raise the temperature of the gas stream about 5° F. to 35° F. in order to at least revaporize the droplets, and preferably also to insure that the gas stream contacting the silica gel is less than saturated with respect to $H_2O$.

Numerous modifications of the process of this invention will be obvious to those skilled in the art without departure from the proper scope and spirit thereof. For example, instead of incorporating the silica gel, the molecular sieve and the heat sink material into the same bed, separate beds for each material can be used, or the heat sink material can be included in the bed with either of the adsorbent materials. Also, twin bed systems can be employed in order that one system is on the adsorption stroke while the other system is being regenerated.

What is claimed is:

1. In the process for recovering nitrogen oxides which comprises the steps of providing a gas stream comprising water vapor, nitrogen and at least one of the gases NO and $NO_2$, said gas stream also containing oxygen when $NO_2$ is absent therefrom, contacting said gas stream with an adsorbent silica gel in relative proportions and for sufficient time to remove substantially all of the water vapor therefrom, and thereafter contacting the resulting dehydrated gas stream with an activated crystalline zeolitic molecular sieve adsorbent whereby at least some of any NO present is oxidized to $NO_2$ and $NO_2$ is adsorbed thereon, the improvement which comprises providing a solid heat sink and passing the effluent purge gas from the molecular sieve bed therethrough prior to passing said stream through the silica gel bed at least during the period when the temperature of the effluent gas from the molecular sieve bed is at least as high as the purge gas entering the inlet end of the molecular sieve bed, the heat sink having sufficient heat capacity to prevent the heat front leaving the molecular sieve bed from entering the silica gel bed until after at least 50% of the $NO_2$ from the molecular sieve bed has passed through the silica gel bed.

2. Process according to claim 1 wherein the heat sink has sufficient heat capacity to prevent the heat front leaving the molecular sieve bed from entering the silica gel bed until after at least 80% of the $NO_2$ from the molecular sieve bed has passed through the silica gel bed.

3. Process according to claim 1 wherein the gas stream being treated to remove water and nitrogen oxides is saturated with respect to water, said process including the additional steps of cooling the gas stream to condense water therefrom and heating the stream to render same less than saturated with respect to water prior to contact with the silica gel.

References Cited

UNITED STATES PATENTS

| | | | |
|---|---|---|---|
| 2,568,396 | 9/1951 | James | 23—161 |
| 2,578,674 | 12/1951 | Daniels et al. | 23—161 |
| 3,015,369 | 1/1962 | Brennan | 55—75 X |
| 3,242,651 | 3/1966 | Arnoldi | 55—31 X |

OTHER REFERENCES

Ganz: "Absorption of Nitrogen Oxides by Aluminosilicate Sorbent," Zhur Priclad. Khim, vol. 31, 1958, pp. 360–68.

OSCAR R. VERTIZ, Primary Examiner

G. O. PETERS, Assistant Examiner

U.S. Cl. X.R.

23—2; 55—31, 76